US010465703B2

(12) United States Patent
Pope

(10) Patent No.: US 10,465,703 B2
(45) Date of Patent: Nov. 5, 2019

(54) AIRFOIL

(71) Applicant: United Technologies Corporation, Hartford, CT (US)

(72) Inventor: Andrew Pope, Glendale, NY (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 674 days.

(21) Appl. No.: 15/095,441

(22) Filed: Apr. 11, 2016

(65) Prior Publication Data

US 2017/0292530 A1    Oct. 12, 2017

(51) Int. Cl.
| B32B 15/04 | (2006.01) |
| B32B 15/14 | (2006.01) |
| F01D 5/14 | (2006.01) |
| F01D 5/28 | (2006.01) |
| F04D 29/32 | (2006.01) |
| F04D 29/38 | (2006.01) |

(52) U.S. Cl.
CPC .......... *F04D 29/388* (2013.01); *B32B 15/043* (2013.01); *B32B 15/14* (2013.01); *F01D 5/147* (2013.01); *F01D 5/282* (2013.01); *F04D 29/325* (2013.01); *B32B 2262/103* (2013.01); *B32B 2262/106* (2013.01); *B32B 2603/00* (2013.01)

(58) Field of Classification Search
CPC ........ F01D 5/147; F01D 5/282; F04D 29/325; F04D 29/388; B32B 2603/00
See application file for complete search history.

(56) References Cited

U.S. PATENT DOCUMENTS

| 3,649,425 | A | * | 3/1972 | Alexander | ......... B23K 20/2333 |
| | | | | | 156/213 |
| 4,000,956 | A | * | 1/1977 | Carlson | ................... B23P 15/04 |
| | | | | | 416/229 A |
| 4,726,101 | A | * | 2/1988 | Draghi | .................... B22F 7/062 |
| | | | | | 228/119 |
| 4,753,850 | A | * | 6/1988 | Ibe | ......................... C22C 47/20 |
| | | | | | 428/608 |
| 5,038,291 | A | * | 8/1991 | Wang | ..................... B29C 70/30 |
| | | | | | 345/420 |
| 5,110,652 | A | * | 5/1992 | Allaire | .................... B32B 18/00 |
| | | | | | 264/112 |

(Continued)

FOREIGN PATENT DOCUMENTS

| EP | 0496550 | 7/1992 |
| WO | 201500735852 | 5/2015 |

OTHER PUBLICATIONS

Internet print-out of https://web.archive.org/web/20150311193054/https://www.suppliersonline.com/propertypages/1060.asp (published Mar. 11, 2015).*

(Continued)

*Primary Examiner* — Woody A Lee, Jr.
*Assistant Examiner* — Christopher R Legendre
(74) *Attorney, Agent, or Firm* — Snell & Wlmer, L.L.P.

(57) ABSTRACT

The present disclosure provides methods and systems for an airfoil of a gas turbine engine. An airfoil of a gas turbine engine may comprise an airfoil body having a body contact surface, and an airfoil edge coupled to the body contact surface, wherein at least one of the airfoil body or airfoil edge comprises a fiber metal laminate.

2 Claims, 9 Drawing Sheets

(56) References Cited

U.S. PATENT DOCUMENTS

| | | | | |
|---|---|---|---|---|
| 5,141,400 | A * | 8/1992 | Murphy | B29C 43/18 416/204 A |
| 5,269,058 | A * | 12/1993 | Wiggs | B21D 26/055 228/157 |
| 5,672,417 | A * | 9/1997 | Champenois | F01D 5/282 416/230 |
| 6,843,928 | B2 * | 1/2005 | Cline | C23F 1/26 216/100 |
| 7,575,417 | B2 * | 8/2009 | Finn | F01D 5/147 416/230 |
| 8,655,627 | B2 * | 2/2014 | Grape | G06F 17/5095 700/98 |
| 8,974,884 | B2 * | 3/2015 | Fabre | F01D 5/16 428/67 |
| 9,524,356 | B2 * | 12/2016 | Chen-Keat | G06F 17/50 |
| 2005/0081965 | A1 * | 4/2005 | Benedictus | C22C 21/16 148/552 |
| 2011/0054850 | A1 * | 3/2011 | Roach | B29C 70/30 703/1 |
| 2012/0301292 | A1 * | 11/2012 | Deal | F01D 5/147 415/220 |
| 2014/0112796 | A1 * | 4/2014 | Kray | F04D 29/023 416/226 |
| 2014/0311149 | A1 * | 10/2014 | Chuang | F04D 29/384 60/726 |
| 2016/0250812 | A1 * | 9/2016 | Roach | B29C 70/345 264/258 |
| 2017/0292530 | A1 * | 10/2017 | Pope | F04D 29/388 |
| 2018/0216477 | A1 * | 8/2018 | Kittleson | F01D 5/284 |

OTHER PUBLICATIONS

Sinmazcelik, Sinmazcelik et al. "A review: fibre metal laminates, background, bonding types and applied test methods", Materials and Design, vol. 32, 2011, pp. 3671-3685 (Year: 2011).*

McCarthy, M.A. et al. "Modelling of Bird Strike on an Aircraft Wing Leading Edge Made from Fibre Metal Laminates—Part 2: Modelling of Impact with SPH Bird Model", Applied Composite Materials, vol. 11, pp. 317-340, 2004 (Year: 2004).*

EP Search Report dated Aug. 11, 2017 in EP Application No. 17166091.3.

European Patent Office, European Office Action dated Sep. 9, 2018 in Application No. 17166091 .3-1006.

* cited by examiner

AIRFOIL

FIELD OF THE DISCLOSURE

The present disclosure relates airfoils for gas turbine engines.

BACKGROUND OF THE DISCLOSURE

Airfoils facilitate airflow through gas turbine engines. Some airfoils may be exposed to impact by an object during gas turbine engine operation. Therefore, airfoils may be comprised of material able to withstand such an impact during gas turbine engine operation.

SUMMARY OF THE DISCLOSURE

In various embodiments, an airfoil of a gas turbine engine may comprise an airfoil body having a body contact surface and an airfoil edge coupled to the body contact surface, wherein at least one of the airfoil body or the airfoil edge comprises a fiber metal laminate. In various embodiments, the airfoil body and the airfoil edge comprise a fiber metal laminate. The airfoil body and the airfoil edge may be integral.

In various embodiments, the fiber metal laminate may comprise a metal layer comprising titanium and/or a titanium alloy. The titanium alloy may comprise, by weight, 5.5-6.75 percent aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium. In various embodiments, the fiber metal laminate may comprise a carbon fiber layer. The fiber metal laminate may comprise a metal layer comprising aluminum and/or an aluminum alloy. In various embodiments, the aluminum alloy may comprise, by weight, a minimum of 99.6 percent aluminum, and a maximum of 0.05 percent copper, 0.35 percent iron, 0.03 percent manganese, 0.03 percent magnesium, 0.25 percent silicon, 0.03 percent titanium, 0.05 percent vanadium, 0.05 percent zinc. In various embodiments, the aluminum alloy may comprise, by weight, a maximum of 0.50 percent silicon, 0.50 percent iron, 0.10 percent chromium, 0.25 percent zinc, 0.15 percent titanium, and 3.8-4.9 percent copper, 0.3-0.9 percent manganese, 1.2-1.8 percent magnesium, with the remainder being aluminum. In various embodiments, the fiber metal laminate may comprise a fiber-reinforced polymer layer, an aramid fiber, and/or a para-aramid fiber. In various embodiments, the airfoil edge may comprise a fiber metal laminate and the airfoil body may comprise a composite material.

In various embodiments, a method for forming an airfoil of a gas turbine engine may comprise providing a raw material comprising a fiber metal laminate and shaping the raw material into an airfoil shape. In various embodiments, shaping the raw material may comprise machining the raw material. In various embodiments, the fiber metal laminate may comprise titanium, a titanium alloy, aluminum, and/or an aluminum alloy.

In various embodiments, a method for forming an airfoil of a gas turbine engine may comprise forming a pressure side half of the airfoil, wherein the pressure side half comprises a fiber metal laminate, forming a suction side half of the airfoil, wherein the suction side half comprises the fiber metal laminate, and coupling the pressure side half to the suction side half.

In various embodiments, forming the pressure side half may comprise coupling a middle pressure side layer to an outer pressure side layer having an outer pressure side length, the middle pressure side layer may comprise a middle pressure length, and coupling an inner pressure side layer to the middle pressure side layer, the inner pressure side layer may comprise an inner pressure side length. The outer pressure side length may be larger than the middle pressure side length, and/or the middle pressure side length may be larger than the inner pressure side length. In various embodiments the outer pressure side layer, the middle pressure side layer, and/or the inner pressure side layer may comprise titanium and/or a titanium alloy.

In various embodiments, forming the suction side half may comprise coupling a middle suction side layer to an outer suction side layer having an outer suction side length, the middle suction side layer may comprise a middle suction side length, and coupling an inner suction side layer to the middle suction side layer, the inner suction side layer may comprise an inner suction side length. The outer suction side length may be larger than the middle suction side length, and/or the middle suction side length may be larger than the inner suction side length.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

All ranges may include the upper and lower limit values, and all ranges and ratio limits disclosed herein may be combined. It is to be understood that unless specifically stated otherwise, references to "a," "an," and/or "the" may include one or more than one and that reference to a component or step in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
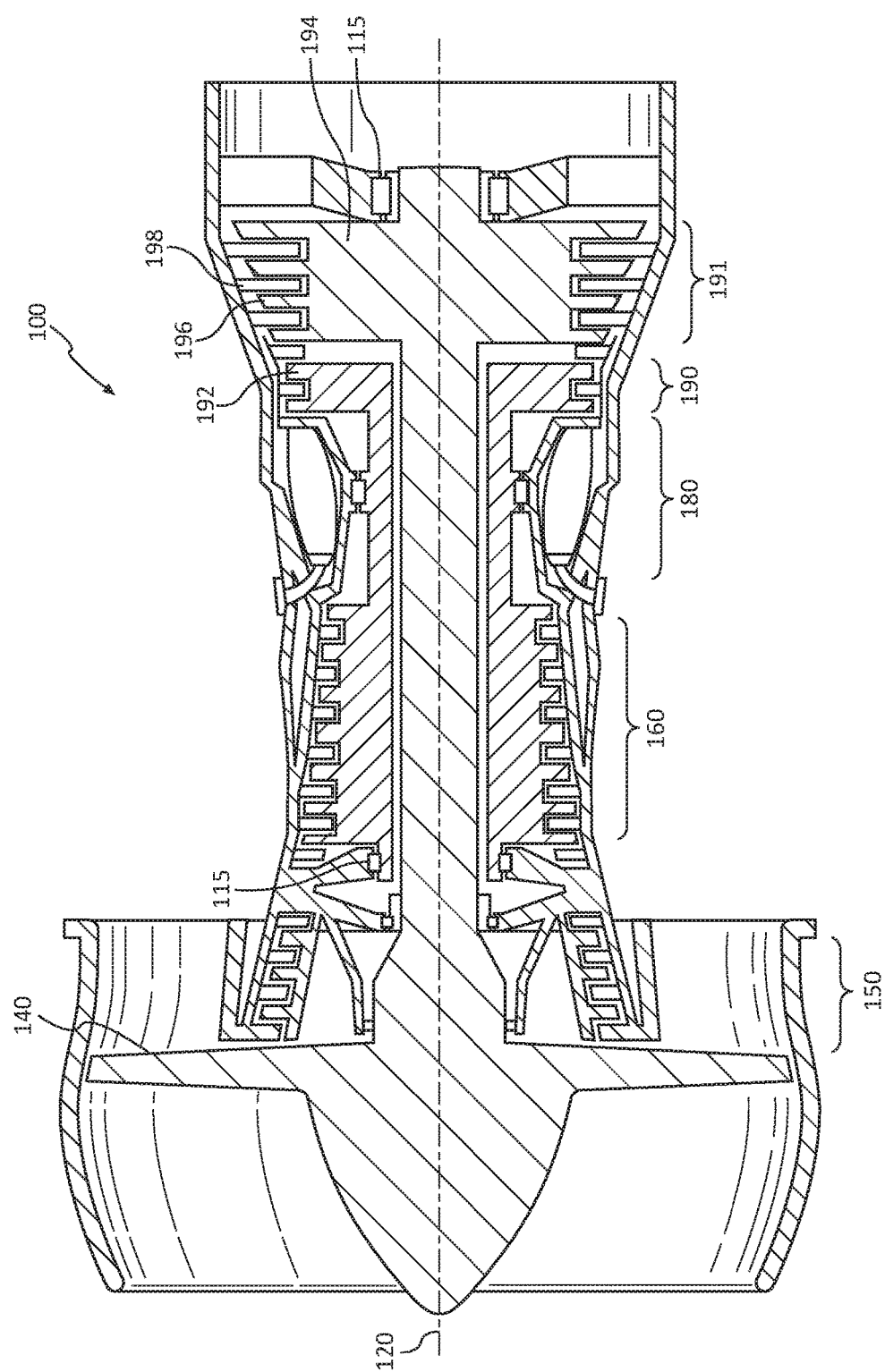
FIG. 1 illustrates a cross-sectional view of a gas turbine engine, in accordance with various embodiments.

Referring to FIG. 1, a gas turbine engine 100 is illustrated according to various embodiments. Gas turbine engine 100 is disposed about axis of rotation 120. Gas turbine engine 100 may comprise a fan 140, compressor sections 150 and 160, a combustion section 180, and turbine sections 190, 191. Air compressed in compressor sections 150, 160 may be mixed with fuel and burned in combustion section 180 and expanded across turbine sections 190, 191. Turbine sections 190, 191 may include high pressure rotors 192 and low pressure rotors 194, which rotate in response to the expansion. Turbine sections 190, 191 may comprise alternating rows of rotary airfoils or blades 196 and static airfoils or vanes 198. A plurality of bearings 115 may support spools to which the rotors are affixed in gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Airfoils comprised as part of fan 140, compressor sections 150, 160, and/or turbine sections 190, 191 may rotate about axis of rotation 120 at a fast rate during gas turbine engine operation (e.g., 10,000 to 500,000 revolutions per minute). Therefore, in the case of an impact with an object (e.g., a bird) during engine operation, airfoils should be comprised of material capable of withstanding such an impact without sustaining damage. The blades of fan 140 should be able to withstand such an impact because fan 140 comprises the forward-most airfoils in the gas turbine engine, which will be the first point of impact of the gas turbine engine with a foreign object.

An airfoil, such as a fan blade, may be comprised of a fiber metal laminate ("FML"). An FML is a structural material comprising layers of composite material among layers of metal. Such a structure allows the FML to have the strength properties of the metal comprised in the metal layers, along with the properties associated with the composite material layers, such as corrosion resistance, low density, elasticity, and/or fatigue, among others, that are more advantageous than those properties associated with metals. As used herein, unless stated otherwise, "metal" may refer to an elemental metal and/or a metal alloy.

Figure 2:
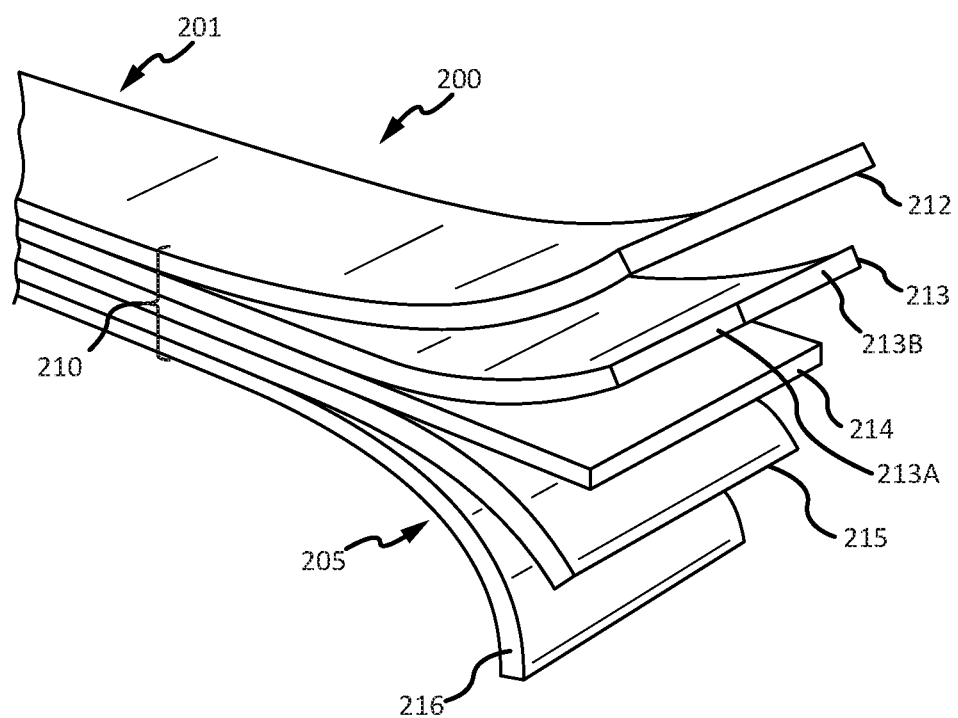
FIG. 2 illustrates a perspective, semi-exploded view of a fiber metal laminate, in accordance with various embodiments.

With reference to FIG. 2, an FML 200 may comprise FML layers 205 in a stack 210, comprising at least one metal layer and at least one composite material layer. In various embodiments, metal layers may alternate with composite material layers in stack 210 of FML layers 205. For example, layers 212, 214, and/or 216 may comprise metal, and layers 213 and 215 may comprise composite material. In various embodiments, the outer layers of FML 200, layers 212 and 216 in FIG. 2, may comprise metal layers. In various embodiments, the outer layers of FML 200, layers 212 and 216 in FIG. 2, may comprise composite material. In various embodiments, FML layers 205 may comprise a metal layer adjacent to another metal layer and/or a composite material layer adjacent to another composite metal layers. FML layers 205 of FML 200 may be arranged in any suitable arrangement, in addition to the arrangements described herein.

In various embodiments, one or more of FML layers 205 of FML 200 may be split, such as layer 213. Layer 213, for example, may comprise a first portion 213A and a second portion 213B. First portion 213A may comprise the same or different material than second portion 213B. For example, first portion 213A may comprise metal while second portion 213B may comprise composite material, or vice versa. Such a split configuration, such as layer 213, may be referred to as a mixed layer. A mixed layer may comprise any number of different materials. In various embodiments, the layers adjacent to a mixed layer, such as layers 212 and 214 in FIG. 2, may be an FML layer 205 comprising a single material, or may be a mixed layer. Layers 212 and 214 may both comprise a metal layer, both comprise a composite material layer, or layers 212 may comprise a metal while 214 may comprise a composite material, or vice versa.

In various embodiments, an FML may comprise one or more stacks 210 of FML layers 205 comprising any suitable arrangement of FML layers 205, for example, the arrangements described herein.

In various embodiments, a metal layer in FML 200 may comprise a metal or metal alloy. In various embodiments, a metal layer in FML 200 may comprise titanium metal and/or aluminum metal. In various embodiments, a metal layer in FML 200 may comprise any titanium alloy, such as a titanium alloy comprising, by weight, 5.5-6.75 percent aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium, commonly known by the industry standard designation of Titanium 6Al-4V, and hereinafter referred to as "Titanium 6Al-4V." In various embodiments, a metal layer in FML 200 may comprise any aluminum alloy, such as an aluminum alloy comprising, by weight, a minimum of 99.6 percent aluminum, and a maximum of 0.05 percent copper, 0.35 percent iron, 0.03 percent manganese, 0.03 percent magnesium, 0.25 percent silicon, 0.03 percent titanium, 0.05 percent vanadium, 0.05 percent zinc, wherein such aluminum alloy is commonly known by the industry standard designation of Aluminum 1060, described, among other places, by ASTM International Standard B210, and hereinafter referred to as "Aluminum 1060." In various embodiments, a metal layer in FML 200 may comprise an aluminum alloy comprising, by weight, a maximum of 0.10 percent silicon, 0.15 percent iron, 0.04 percent chromium, 0.05 percent manganese, 0.6 percent titanium, and 2.0-2.6 percent copper, 1.8-2.3 percent magnesium, 7.6-8.4 percent zinc, 0.08-0.25 percent zirconium, with the remainder being aluminum, commonly known by the industry standard designation of Aluminum 7055 and hereinafter referred to as "Aluminum 7055." In various embodiments, a metal layer in FML 200 may comprise an aluminum alloy comprising, by weight, a maximum of 0.50 percent silicon, 0.50 percent iron, 0.10 percent chromium, 0.25 percent zinc, 0.15 percent titanium, and 3.8-4.9 percent copper, 0.3-0.9 percent manganese, 1.2-1.8 percent magnesium, with the remainder being aluminum, commonly known by the industry standard designation of Aluminum 2024 and hereinafter referred to as "Aluminum 2024." Aluminum 2024 may further comprise 0.15 percent by weight of other unspecified metallic elements.

In various embodiments, FML layers 205 comprising composite material may comprise any composite material such as carbon fiber, fiber-reinforced polymer (e.g., fiber glass), para-aramid fiber, and/or aramid fiber. In various embodiments, in which an FML comprises metal layers comprising titanium and/or a titanium alloy, the composite material layers in the FML may comprise carbon fiber, such as graphite fiber. The combination of a metal layer comprising titanium and a composite material layer comprising carbon fiber may occur because titanium and carbon fiber do not form a galvanic cell, and therefore, galvanic corrosion may not occur. An FML comprising titanium and/or a titanium alloy and graphite fiber is commonly known in the industry as "TiGr." In various embodiments, in which an FML comprises metal layers comprising aluminum and/or an aluminum alloy, the composite material layers in the FML may comprise fiber-reinforced polymer (e.g., fiber glass), para-aramid fiber, and/or aramid fiber. The combination of a metal layer comprising aluminum and a composite material layer comprising fiber glass and/or aramid fiber may occur because aluminum and fiber glass and/or aramid fiber do not form a galvanic cell, and therefore, galvanic corrosion may not occur. An FML comprising aluminum and/or an aluminum alloy and fiber glass is commonly known by the industry standard designation of "GLARE."

Though FMLs described above include specific examples of metals, metal alloys, and/or composite materials, it would not be outside the scope of this disclosure to include any FML comprising any metal, metal alloy, and/or composite material, in any arrangement of layers.

In various embodiments, FML layers 205 and/or stacks 210 of FML layers 205 may be coupled together using an adhesive material. In various embodiments, the adhesive material may comprise, for example, one or more epoxies, bismalemides, cyanate esters, or polyimides, and may be a supported or unsupported film and/or paste. A supported adhesive material may comprise a support comprised of nylon, polyester, fiberglass, or glass, which may be woven or non-woven. In various embodiments the adhesive material may comprise an amine cured, toughened epoxy resin system supplied with unidirectional and/or woven carbon or glass fibers.

Figure 3:
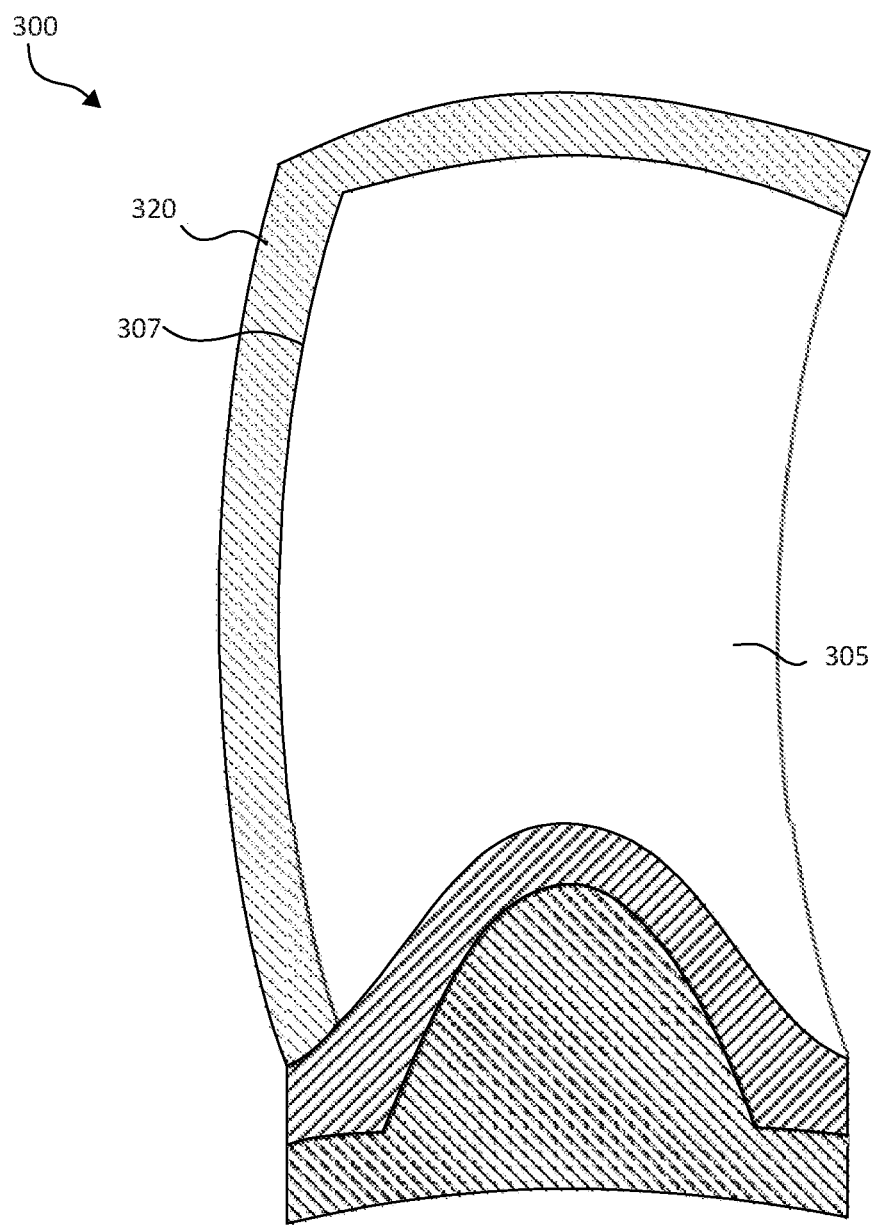
FIG. 3 illustrates a perspective view of an airfoil of a gas turbine engine, in accordance with various embodiments.

Referring to FIG. 3, in various embodiments, an airfoil 300 may comprise an airfoil body 305 comprising a body contact surface 307 and an airfoil edge 320. Airfoil edge 320 may be coupled to body contact surface 307. In various embodiments, airfoil body 305 and airfoil edge 320 may be integral, that is, airfoil body 305 and airfoil edge 320 may comprise one continuous piece of material. In various embodiments, airfoil body 305 and/or airfoil edge 320 may comprise an FML. In various embodiments, airfoil body 305 may comprise the same FML as airfoil edge 320. When airfoil body 305 and airfoil edge 320 comprise the same FML, airfoil body 305 and airfoil edge 320 may be integral. In various embodiments, airfoil body 305 may comprise a different FML than airfoil edge 320, and the FML of airfoil body 305 may comprise the same configuration as, or a different configuration from, the FML of airfoil edge 320. Airfoil body 305 and/or airfoil edge 320 may comprise any FML, including those described herein, i.e., comprising any metal and/or metal alloy in the metal layers of the FML, and/or any composite material in the composite material layers of the FML, with the layers of the FML being in any suitable arrangement. In various embodiments, airfoil edge 320 may comprise an FML and airfoil body 305 may comprise a composite material, such as carbon fiber.

In various embodiments, in which airfoil body 305 is a separate piece from airfoil edge 320, airfoil body 305 may be coupled to airfoil edge 320 with an adhesive material. In various embodiments, the adhesive material may comprise, for example, one or more epoxies, bismalemides, cyanate esters, or polyimides, and may be a supported or unsupported film and/or paste. A supported adhesive material may comprise a support comprised of nylon, polyester, fiberglass, or glass, which may be woven or non-woven. In various embodiments the adhesive material may comprise an amine cured, toughened epoxy resin system supplied with unidirectional and/or woven carbon or glass fibers.

Because airfoil edge 320 and/or airfoil body 305 may comprise an FML, as described herein, airfoil edge 320 and/or airfoil body 305 may have the strength associated with the metal or metal alloy comprised in the FML metal layer(s). Therefore, an airfoil, such as a fan blade, being comprised of an FML may be able to withstand an impact from an object (e.g., a bird) during gas turbine engine operation because of the strength of FML. Additionally, airfoil edge 320 and/or airfoil body 305 may have the beneficial properties associated with the composite material comprised in the composite material layers of the FML. Such beneficial properties may include corrosion resistance, low density (lighter weight than metal), elasticity, and/or fatigue, which may be better than if the airfoil edge 320 and/or airfoil body 305 were comprised only of metal or a metal alloy. Therefore, an airfoil, such as a fan blade, being comprised of an FML may also allow greater engine efficiency because of the airfoil's lighter weight than a metal airfoil, and/or may allow greater component longevity because the airfoil tends not be compromised or worn from corrosion, fatigue, or other conditions as rapidly as a metal airfoil.

Figure 4A:
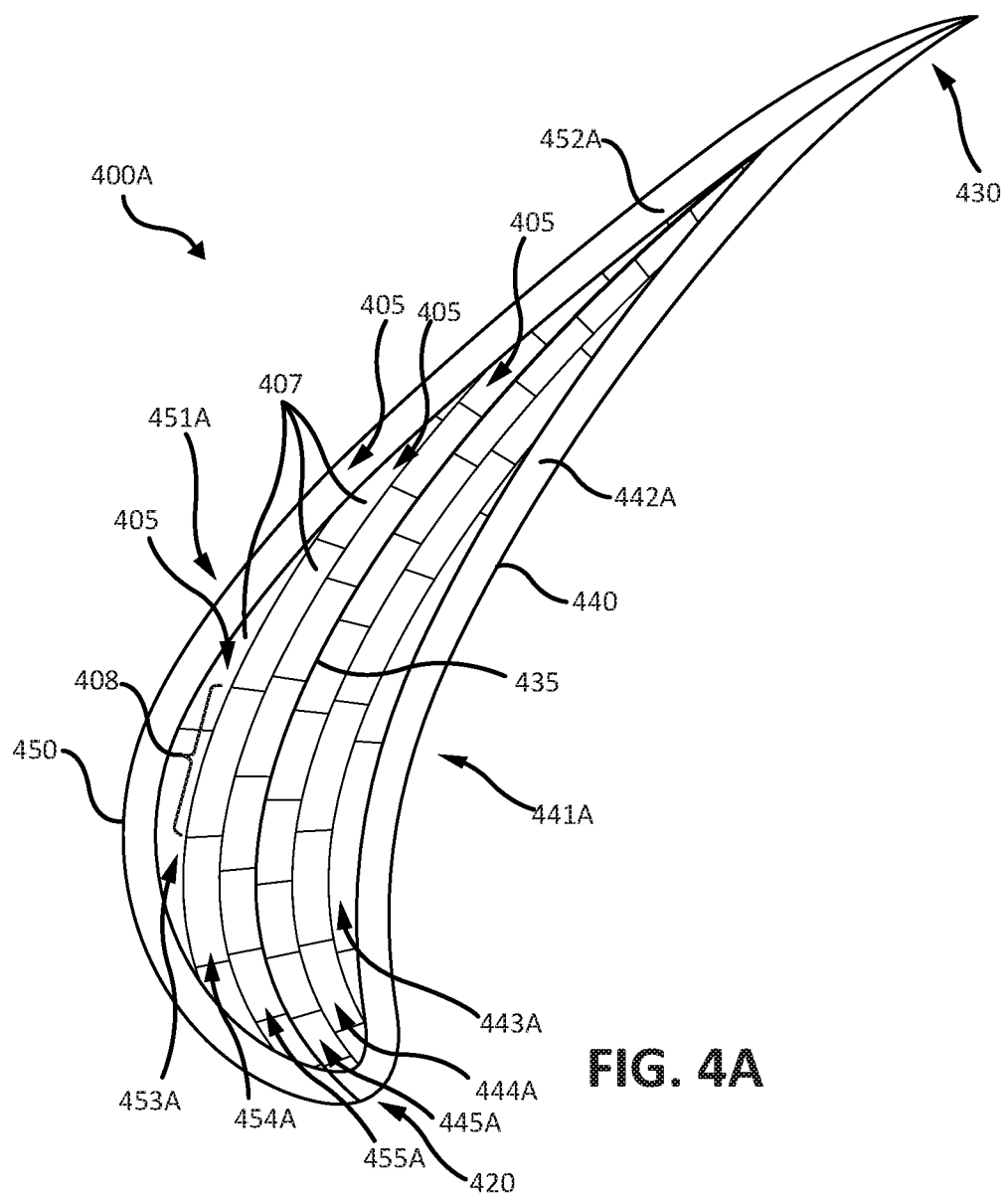
FIG. 4A illustrates a horizontal cross sectional view of an airfoil, in accordance with various embodiments.
Figure 4B:
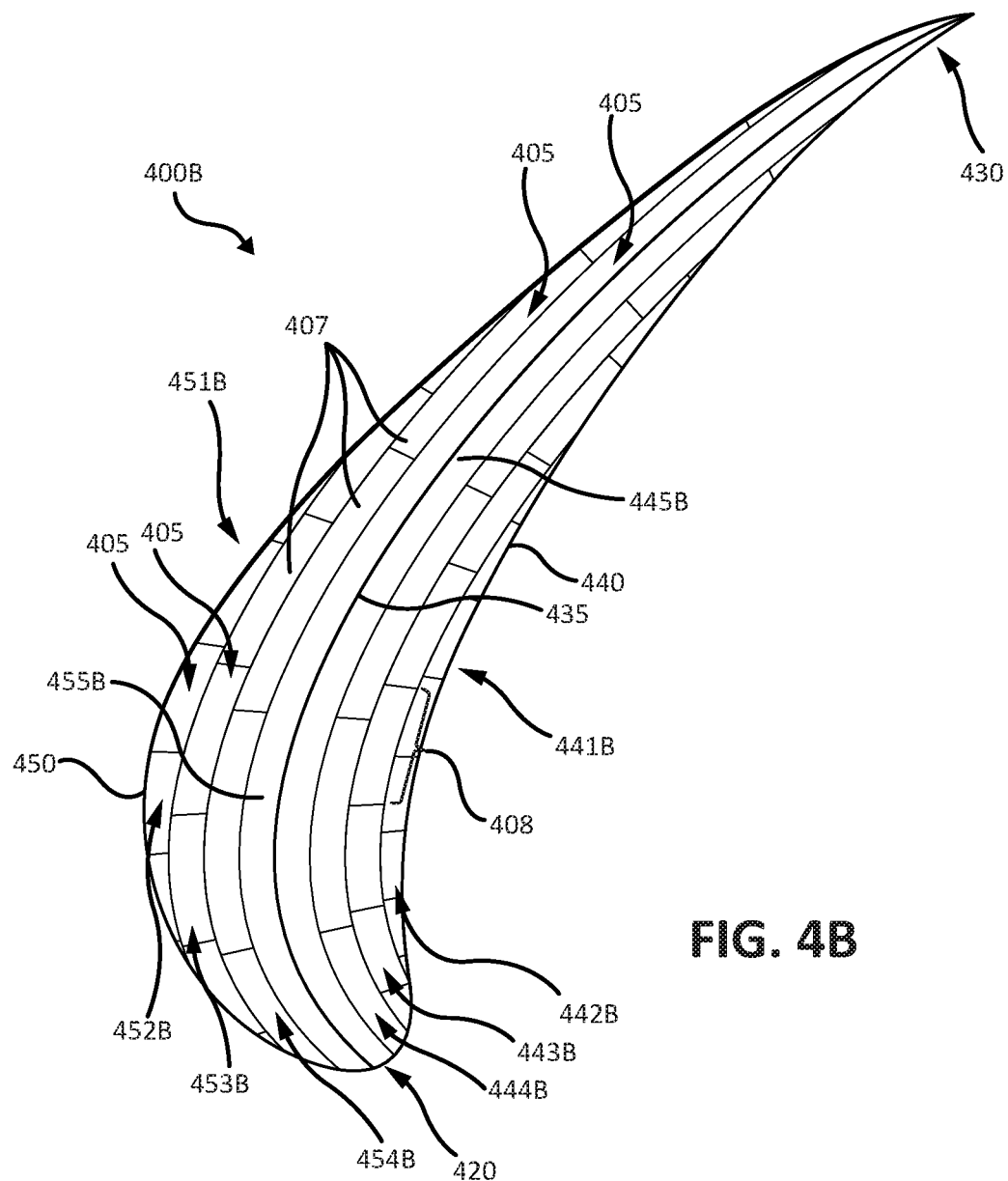
FIG. 4B illustrates a horizontal cross sectional view of an airfoil, in accordance with various embodiments.

In various embodiments, FML layers 205 may be flat (i.e., disposed along one two-dimensional plane), as depicted in area 201 in FIG. 2. In various embodiments, as depicted in FIGS. 4A and 4B, layers of FML may be contoured to fit the contours of an airfoil 400A (or 400B). Referring further to FIGS. 4A and 4B, an airfoil 400A or 400B, in accordance with various embodiments, may be comprised of layers 405 spanning some length of the airfoil. The airfoil may comprise any number of layers 405. Each layer may comprise any number of plies 407. As depicted in FIGS. 4A and 4B, each layer 405 may span some length between a leading edge 420 and a trailing edge 430, with layers 405 being stacked relative to one another between a pressure side 440 and a suction side 450 of the airfoil. In various embodiments, each layer 405 may span between pressure side 440 and suction side 450, with layers being stacked relative to one another between leading edge 420 and trailing edge 430. Layers 405 may span in any suitable direction of the airfoil.

In various embodiments, with combined reference to FIGS. 2 and 4A,B, each layer 405 may comprise a stack 210 of FML layers 205, i.e., each layer 405 may comprise an FML. In various embodiments, each layer 405 may comprise a metal or metal alloy and/or a composite material, so together, layers 405 may form an FML.

Referring to FIGS. 4A and 4B, in various embodiments, airfoils 400A and 400B may comprise a pressure side half 441A and 441B, respectively, between center line 435 and pressure side 440, and a suction side half 451A and 451B, respectively, between center line 435 and suction side 450. Referring to FIG. 4A, airfoil 400A may comprise an outer pressure side layer 442A, which may be comprised of one continuous piece of material, i.e., one ply 407, or any suitable number of plies. In various embodiments, outer pressure side layer 442A may span along the entire pressure side 440 of airfoil 400A. In various embodiments, outer pressure side layer 442A may span only a portion of pressure side 440. A middle pressure side layer 443A may be disposed adjacent to, and/or coupled to, outer pressure side layer 442A. Middle pressure side layer 443A may comprise a middle pressure side plurality of plies, which may have any number of plies 407. In various embodiments, airfoil 400A may comprise any number of middle pressure side layers between outer pressure side layer 442A and an inner pressure side layer 445A, such as middle pressure side layer 444A. In various embodiments, inner pressure side layer 445A may be the layer 405 of pressure side half 441A that is adjacent to center line 435. Inner pressure side layer 445A may comprise an inner pressure side plurality of plies, which may have more plies 407 than middle pressure side plurality of plies. In general, in various embodiments, the number of plies 407 in layers 405 may be greater in layers 405 more proximate to center line 435 than in layers 405 more proximate to pressure side 440. Accordingly, in various embodiments, middle pressure side layer 443A may have a middle pressure side plurality of plies comprising more plies 407 than outer pressure side layer 442A, and fewer plies 407 than the inner pressure side plurality of plies comprised in inner pressure side layer 445A.

In various embodiments, airfoil 400A may comprise an outer suction side layer 452A, which may be comprised of one continuous piece of material, i.e., one ply 407, or any suitable number of plies 407. In various embodiments, outer suction side layer 452A may span along the entire suction side 450 of airfoil 400A. In various embodiments, outer suction side layer 452A may span only a portion of suction side 450. A middle suction side layer 453A may be disposed adjacent to, and/or coupled to, outer suction side layer 452A. Middle suction side layer 453A may comprise a middle suction side plurality of plies 407, which may have any number of plies 407. In various embodiments, airfoil 400A may comprise any number of middle suction side layers between outer suction side layer 452A and an inner suction side layer 455A, such as middle suction side layer 454A. In various embodiments, inner suction side layer 455A may be the layer 405 on the suction side half 451A that is adjacent to center line 435. Inner suction side layer 455A may comprise an inner suction side plurality of plies, which may have more plies 407 than middle suction side plurality of plies. In general, in various embodiments, the number of plies 407 in layers 405 may be greater in layers 405 more proximate to center line 435 than in layers 405 more proximate to suction side 450. Accordingly, in various embodiments, middle suction side layer 453A may have a middle suction side plurality of plies comprising more plies than outer suction side layer 452A, and fewer plies than the inner suction side plurality of plies comprised in inner suction side layer 455A.

In various embodiments, plies 407 in layers 405 each may comprise a ply length 408. In various embodiments, as depicted in FIG. 4A, the ply length 408 of plies 407 may be smaller in layers 405 more proximate to center line 435 than the ply length 408 of plies 407 in layers 405 more proximate to pressure side 440 and/or suction side 450. Stated another way, in pressure side half 441A, the ply length 408 may be larger on plies 407 that are in layers 405 more proximate to pressure side 440 than the ply length 408 on plies 407 that are in layers 405 more proximate to center line 435. Similarly, in suction side half 451A, the ply length 408 may be larger on plies 407 that are in layers 405 more proximate to suction side 450 than the ply length 408 on plies 407 that are in layers 405 more proximate to center line 435. Though the ply length is discussed, in various embodiments, other dimensions of plies 407 may vary as described herein, e.g., a ply width, height, three-dimensional area, surface area, etc. That is, the width, height, three-dimensional area, surface area, etc. may be larger on plies 407 in layers 405 more proximate to pressure side 440 and/or suction side 450 than plies 407 in layers 405 more proximate to center line 435.

In various embodiments, outer pressure side layer 442A and/or outer suction side layer 452A may comprise an FML and/or a metal or metal alloy.

Referring to FIG. 4B, in various embodiments, airfoil 400B may comprise a pressure side half 441B. Pressure side half 441B may comprise an inner pressure side layer 445B adjacent to center line 435, which may be comprised of one continuous piece of material, i.e., one ply 407, or any suitable number of plies. In various embodiments, inner pressure side layer 445B may span along the entire center line 435. A middle pressure side layer 444B may be disposed adjacent to, and/or coupled to, inner pressure side layer 445B. Middle pressure side layer 444B may comprise a middle pressure side plurality of plies, which may have any number of plies 407. In various embodiments, the middle pressure side plurality of plies may comprise more plies than inner pressure side layer 445B. In various embodiments, airfoil 400B may comprise any number of middle pressure side layers between an outer pressure side layer 442B and inner pressure side layer 445B, such as middle pressure side layer 443B. In various embodiments, outer pressure side layer 442B may be the layer 405 furthest from center line 435 on pressures side half 441B. Outer pressure side layer 442B may comprise an outer pressure side plurality of plies, which may, in various embodiments, have more, the same amount, or fewer plies 407 than the middle pressure side plurality of plies. In general, in various embodiments, the number of plies 407 in layers 405 may be less in layers 405 more proximate to center line 435 than the number of plies 407 in layers 405 more proximate to pressure side 440. Accordingly, in various embodiments, middle pressure side layer 444B may have a middle pressure side plurality of plies comprising fewer plies 407 than outer pressure side layer 442B, and more plies 407 than the inner pressure side plurality of plies comprised in inner pressure side layer 445B.

Referring to FIG. 4B, in various embodiments, airfoil 400B may comprise a suction side half 451B. Suction side half 451B may comprise an inner suction side layer 455B adjacent to center line 435, which may be comprised of one continuous piece of material, i.e., one ply 407, or any suitable number of plies. In various embodiments, inner suction side layer 455B may span along the entire center line 435. A middle suction side layer 454B may be disposed adjacent to, and/or coupled to, inner suction side layer 455B. Middle suction side layer 454B may comprise a middle suction side plurality of plies, which may have any number of plies 407. In various embodiments, the middle suction side plurality of plies may comprise more plies than inner suction side layer 455B. In various embodiments, airfoil 400B may comprise any number of middle suction side layers between outer suction side layer 452B and inner suction side layer 455B, such as middle suction side layer 453B. In various embodiments, outer suction side layer 452B may be the layer 405 furthest from center line 435 on suction side half 451B. Outer suction side layer 452B may comprise an outer suction side plurality of plies, which may, in various embodiments, have more, the same amount, or fewer plies 407 than the middle suction side plurality of plies. In general, in various embodiments, the number of plies 407 in layers 405 may be less in layers 405 more proximate to center line 435 than the number of plies 407 in layers 405 more proximate to pressure side 440. Accordingly, in various embodiments, middle suction side layer 454B may have a middle suction side plurality of plies comprising fewer plies 407 than outer suction side layer 452B, and more plies 407 than the inner suction side plurality of plies comprised in inner suction side layer 455B.

In various embodiments, inner pressure side layer 445B and inner suction side layer 455B may be integral.

In various embodiments, as depicted in FIG. 4B, the ply length 408 of plies 407 may be larger in layers 405 more proximate to center line 435 than the ply length 408 of plies 407 in layers 405 more proximate to pressure side 440 and/or suction side 450. Stated another way, in pressure side half 441B, ply length 408 may be smaller on plies 407 that are more proximate to pressure side 440 than the ply length 408 on plies 407 in layers 405 that are more proximate to center line 435. Similarly, in suction side half 451B, the ply length 408 may be smaller on plies 407 that are more proximate to suction side 450 than the ply length 408 on plies 407 in layers 405 that are more proximate to center line 435. Though the ply length is discussed, in various embodiments, other dimensions of plies 407 may vary as described herein, e.g., a ply width, height, three-dimensional area, surface area, etc. That is, the width, height, three-dimensional area, surface area, etc. may be larger on plies 407 in layers 405 more proximate to center line 435 than plies 407 in layers 405 more proximate to pressure side 440 and/or suction side 450.

Figure 5A:
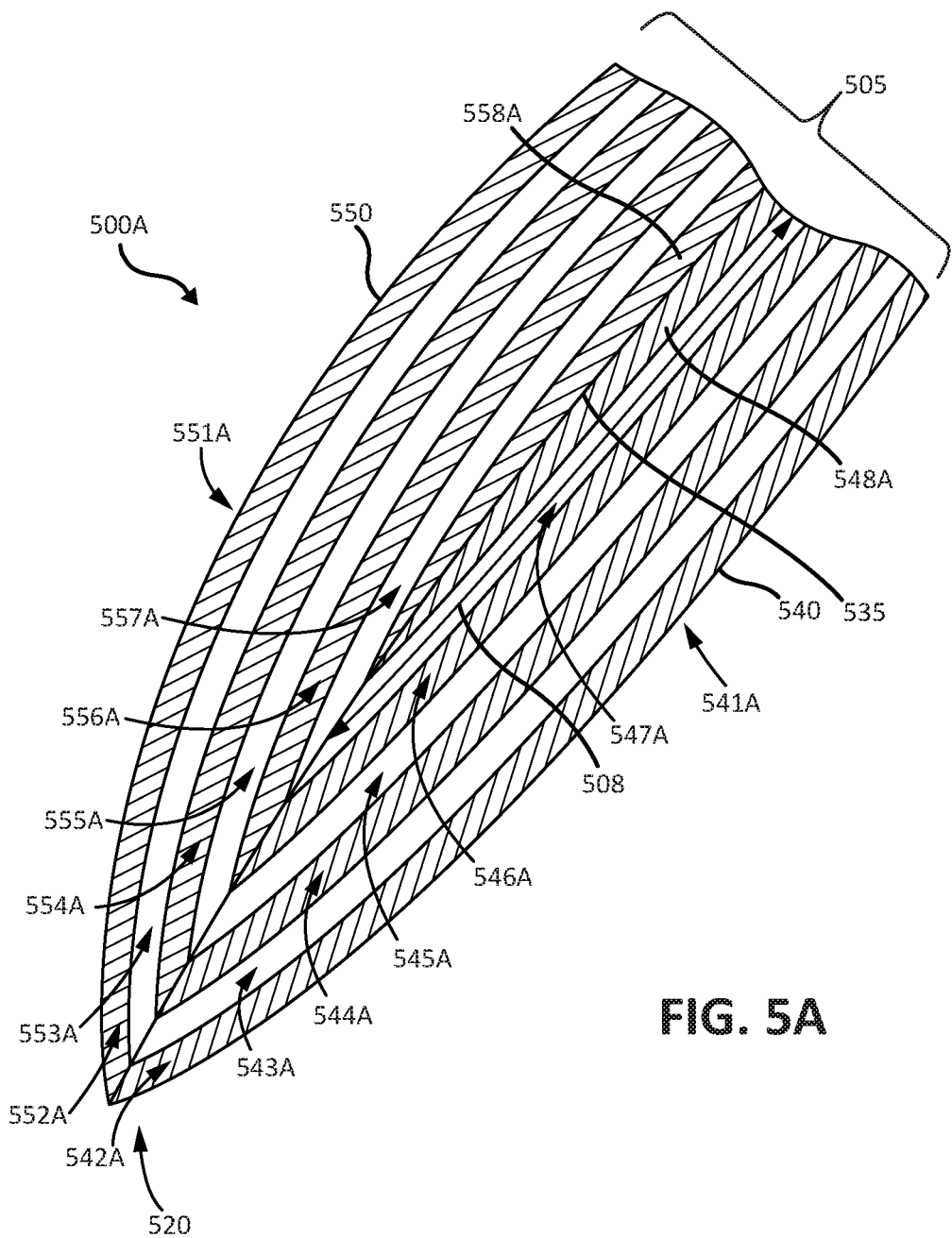
FIG. 5A illustrates a horizontal cross sectional view of a leading edge of an airfoil, in accordance with various embodiments.
Figure 5B:
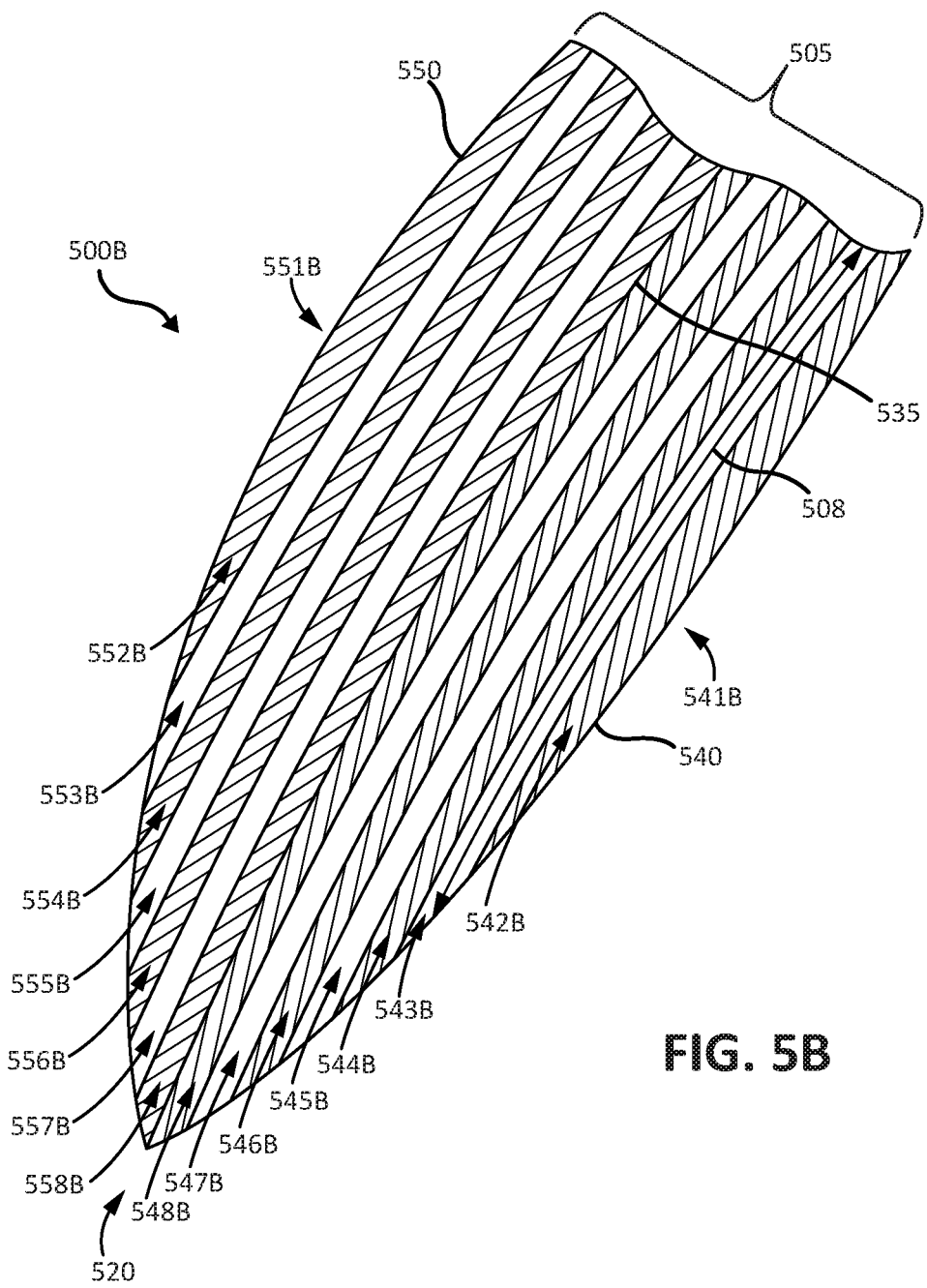
FIG. 5B illustrates a horizontal cross sectional view of a leading edge of an airfoil, in accordance with various embodiments.

FIGS. 5A and 5B depict the leading edges 520, in accordance with various embodiments, of airfoils 500A and 500B. Airfoils 500A and 500B may comprise a pressure side half 541A and 541B, respectively, between center line 535 and pressure side 540, and a suction side half 551A and 551B, respectively, between center line 535 and suction side 550. Layers 505 comprised in airfoils 500A and 500B each may be comprised of a single ply, unlike the exemplary embodiments in FIGS. 4A and 4B. That is, layers 505 may be one, continuous piece of a material. In various embodiments, with combined reference to FIGS. 2 and 5A and 5B, each layer 505 may comprise a stack 210 of FML layers 205, i.e., each layer 505 may comprise an FML. In various embodiments, each layer 505 may comprise a metal or metal alloy and/or a composite material, so together, layers 505 may form an FML.

Referring to FIG. 5A, airfoil 500A may comprise an outer pressure side layer 542A, which may be adjacent to pressure side 540. In various embodiments, outer pressure side layer 542A may span along the entire pressure side 540 of airfoil 500A. In various embodiments, outer pressure side layer 542A may span only a portion of pressure side 540. A middle pressure side layer 543A may be disposed adjacent to, and/or coupled to, outer pressure side layer 542A. In various embodiments, airfoil 500A may comprise any number of middle pressure side layers between outer pressure side layer 542A and an inner pressure side layer 548A, such as middle pressure side layers 544A, 545A, 546A, and 547A. In various embodiments, inner pressure side layer 548A may be the layer 505 of pressure side half 541A that is adjacent to center line 535.

In various embodiments, airfoil 500A may comprise an outer suction side layer 552A, which may be adjacent to suction side 550. In various embodiments, outer suction side layer 552A may span along the entire suction side 550 of airfoil 500A. In various embodiments, outer suction side layer 552A may span only a portion of suction side 550. A middle suction side layer 553A may be disposed adjacent to, and/or coupled to, outer suction side layer 552A. In various embodiments, airfoil 500A may comprise any number of middle suction side layers between outer suction side layer 552A and an inner suction side layer 558A, such as middle suction side layers 554A, 555A, 556A, and 557A. In various embodiments, inner suction side layer 558A may be the layer 405 on the suction side half 551A that is adjacent to center line 535.

In various embodiments, layers 505 each may comprise a length 508. In various embodiments, as depicted in FIG. 5A, the length 508 of layers 505 may be smaller in layers 505 more proximate to center line 535 than the length 508 of layers 505 more proximate to pressure side 540 and/or suction side 550. Though the length of each layer 505 is discussed, in various embodiments, other dimensions of layers 505, and/or the plies in layers 505, may vary as described herein, e.g., a width, height, three-dimensional area, surface area, etc. That is, the width, height, three-dimensional area, surface area, etc. may be larger on layers 505 more proximate to pressure side 540 and/or suction side 550 than on layers 505 more proximate to center line 535.

In various embodiments, outer pressure side layer 542A and/or outer suction side layer 552A may comprise an FML and/or a metal or metal alloy.

Referring to FIG. 5B, in various embodiments, airfoil 500B may comprise a pressure side half 541B. Pressure side half 541B may comprise an inner pressure side layer 548B adjacent to center line 535. In various embodiments, inner pressure side layer 548B may span along the entire center line 535. A middle pressure side layer 547B may be disposed adjacent to, and/or coupled to, inner pressure side layer 548B. In various embodiments, airfoil 500B may comprise any number of middle pressure side layers between an outer pressure side layer 542B and inner pressure side layer 548B, such as middle pressure side layers 543A, 544B, 545B, and 546B. In various embodiments, outer pressure side layer 542B may be the layer 405 furthest from center line 535 on pressures side half 541B.

Referring to FIG. 5B, in various embodiments, airfoil 500B may comprise a suction side half 551B. Suction side half 551B may comprise an inner suction side layer 558B adjacent to center line 535, which may be adjacent to suction side 550. In various embodiments, inner suction side layer 558B may span along the entire center line 535. A middle suction side layer 557B may be disposed adjacent to, and/or coupled to, inner suction side layer 558B. In various embodiments, airfoil 500B may comprise any number of middle suction side layers between outer suction side layer 552B and inner suction side layer 558B, such as middle suction side layers 553B, 554B, 555B, and 556B. In various embodiments, outer suction side layer 552B may be the layer 505 furthest from center line 535 on suction side half 551B.

In various embodiments, layers 505 each may comprise a length 508. In various embodiments, as depicted in FIG. 5B, the length 508 of layers 505 may be smaller in layers 505 more proximate to pressure side 540 and/or suction side 550 than the length 508 of layers 505 more proximate to center line 535. Though the length of each layer 505 is discussed, in various embodiments, other dimensions of layers 505, and/or the plies in layers 505, may vary as described herein, e.g., a width, height, three-dimensional area, surface area, etc. That is, the width, height, three-dimensional area, surface area, etc. may be larger on layers 505 more proximate to pressure side 540 and/or suction side 550 than on layers 505 more proximate to center line 535.

In various embodiments, outer pressure side layer 542B and/or outer suction side layer 552B may comprise an FML and/or a metal or metal alloy.

Figure 6A:
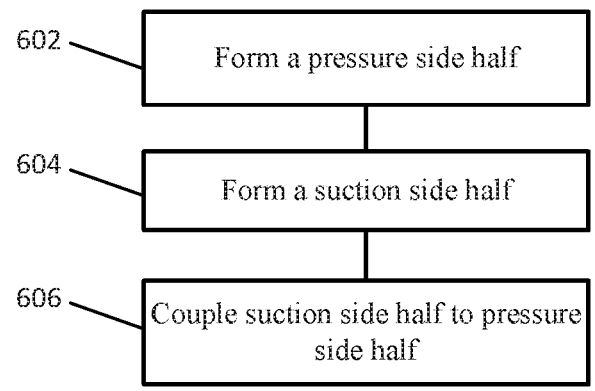
FIG. 6A-C illustrate block diagrams of a method of manufacturing an airfoil, in accordance with various embodiments.
Figure 6B:
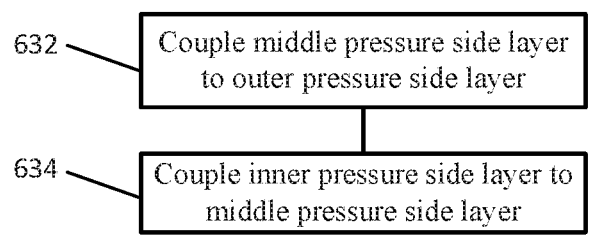
Figure 6C:
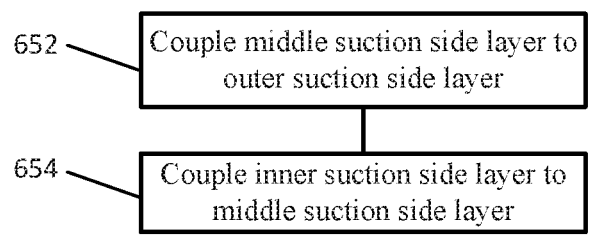

FIGS. 6A-C depict a method for forming an airfoil, in accordance with various embodiments. With reference to FIGS. 6A and 5A,B, a pressure side half 541A (or 541B) may be formed (step 602), a suction side half 551A (or 551B) may be formed (step 604), and pressure side half 541A and suction side half 551A may be coupled (step 606) to form an airfoil. In various embodiments, the pressure side half and/or the suction side half may comprise an FML. In various embodiments, pressure side half 541A and suction side half 551A may be coupled together by coupling inner pressure side layer 548A to inner suction side layer 558A.

With reference to FIG. 6B, a method for forming a pressure side half of an airfoil is depicted, in accordance with various embodiments. In various embodiments, with reference to FIGS. 5A and 6B, pressure side half 541A may be formed by providing an outer pressure side layer 542A, and coupling a middle pressure side layer 543A to outer pressure side layer 542A (step 632). With momentary reference to FIGS. 4A and 4B, in various embodiments, layers comprised in pressure side half 441A may comprise any number of plies 407. The plies 407 in middle pressure side layer 443A may be coupled to outer pressure side layer 442A, which may comprise a solid piece of material (i.e., one ply), simultaneously, one at a time, or any number at a time. Returning to FIGS. 5A and 6B, an inner pressure side layer 548A may be coupled to the middle pressure side layer (step 534) in a similar fashion to middle pressure side layer 543A being coupled to outer pressure side layer 542A. In various embodiments, there may be any number of additional middle pressure side layers, such as middle pressure side layers 544A, 545A, 546A, and 547A, disposed and/or coupled between outer pressure side layer 542A and inner pressure side layer 548A.

In various embodiments, with reference to FIGS. 5A and 6C, suction side half 551A may be formed by providing an outer suction side layer 552A, and coupling a middle suction side layer 553A to outer suction side layer 552A (step 652). With momentary reference to FIGS. 4A and 4B, in various embodiments, layers 405 comprised in suction side half 451A may comprise any number of plies 407. The plies 407 in middle suction side layer 453A may be coupled to outer suction side layer 452A, which may comprise a solid piece of material (i.e., one ply), simultaneously, or one at a time, or any number at a time. Returning to FIGS. 5A and 6C, an inner suction side layer 558A may be coupled to the middle suction side layer (step 654) in a similar fashion to middle suction side layer 553A being coupled to outer suction side layer 552A. In various embodiments, there may be any number of additional middle suction side layers, such as middle suction side layers 554A, 555A, 556A, and 557A, disposed and/or coupled between outer suction side layer 452A and inner suction side layer 558A. The layers, and/or plies, in airfoil 500A may vary in length as described herein.

In various embodiments, pressure side half 541A and suction side half 551A may be coupled after pressure side half 541A and suction side half 551A have been formed.

In various embodiments, with reference to FIGS. 5B, 6B, and 6C, a pressure side half 541B may be formed by coupling a middle pressure side layer 547B to an inner pressure side layer 548B (step 634), and coupling an outer pressure side layer 542B to the middle pressure side layer (step 632). In various embodiments, there may be any number of middle pressure side layers between inner pressure side layer 548B and outer pressure side layer 542B. Similarly, a suction side half 551B may be formed by coupling a middle suction side layer 557B to an inner suction side layer 558B (step 654), and coupling an outer suction side layer 452B to the middle suction side layer (step 652). In various embodiments, there may be any number of middle suction side layers between inner suction side layer 558B and outer suction side layer 452B. In various embodiments, the inner pressure side layer 548B and the inner suction side layer 558B may be integral. The layers, and/or plies, in airfoil 500B may vary in length as described herein.

Figure 7:
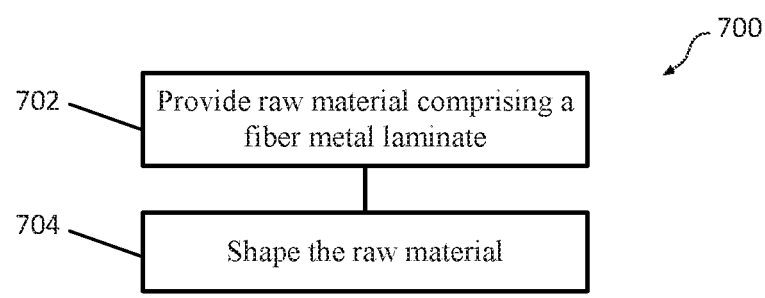
FIG. 7 illustrates a block diagram of a method of manufacturing an airfoil using machining.

In various embodiments, with reference to the method 700 depicted in FIG. 7, in various embodiments, an airfoil may be formed by providing raw material comprising an FML (step 702), and shaping the raw material (step 704) into the shape of an airfoil. The raw material may be comprised of an FML comprising any metal and/or composite material, with layers arranged in any suitable configuration, as described herein. In various embodiments, the layers in the FML, or the layers of FML, may be flat (i.e., disposed along one two-dimensional plane), for example, as depicted in area 201 in FIG. 2, and the contours of an airfoil may be achieved by the shaping of the raw material. The raw material provided may be in a block form that comprises any suitable shape, and may be shaped using milling, grinding, turning, drilling, and/or any other suitable method of machining.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods and systems for the bonding of dissimilar substrates are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming an airfoil of a gas turbine engine, comprising:
    forming a pressure side half of the airfoil, wherein the pressure side half comprises a fiber metal laminate, wherein the forming the pressure side half comprises:
        coupling a middle pressure side layer to an outer pressure side layer having an outer pressure side length and an outer pressure side plurality of plies, the middle pressure side layer comprising a middle pressure side length and a middle pressure side plurality of plies; and
        coupling an inner pressure side layer to the middle pressure side layer, the inner pressure side layer comprising an inner pressure side length and an inner pressure side plurality of plies,
        wherein the outer pressure side length is larger than the middle pressure side length and the middle pressure side length is larger than the inner pressure side length, wherein the outer pressure side plurality of plies comprises fewer plies than the middle pressure side plurality of plies, and wherein the middle pressure side plurality of plies comprises fewer plies than the inner pressure side plurality of plies;
    forming a suction side half of the airfoil, wherein the suction side half comprises the fiber metal laminate, wherein the forming the suction side half comprises:
        coupling a middle suction side layer to an outer suction side layer having an outer suction side length and an outer suction side plurality of plies, the middle suction side layer comprising a middle suction side length and a middle suction side plurality of plies; and
        coupling an inner suction side layer to the middle suction side layer, the inner suction side layer comprising an inner suction side length and an inner suction side plurality of plies,
        wherein the outer suction side length is larger than the middle suction side length and the middle suction side length is larger than the inner suction side length, wherein the outer suction side plurality of plies comprises fewer plies than the middle suction side plurality of plies, and wherein the middle suction side plurality of plies comprises fewer plies than the inner suction side plurality of plies; and
    coupling the pressure side half to the suction side half.

2. The method of claim 1, wherein at least one of the outer pressure side layer, the middle pressure side layer, or the inner pressure side layer comprises at least one of titanium or a titanium alloy.

* * * * *